(12) United States Patent
Addink

(10) Patent No.: US 7,896,381 B2
(45) Date of Patent: Mar. 1, 2011

(54) BICYCLE WHEEL ASSEMBLY

(75) Inventor: Brad J. Addink, Sun Prairie, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 249 days.

(21) Appl. No.: 12/052,208

(22) Filed: Mar. 20, 2008

(65) Prior Publication Data
US 2009/0236818 A1 Sep. 24, 2009

(51) Int. Cl.
B62K 21/02 (2006.01)
B62K 21/06 (2006.01)

(52) U.S. Cl. .............. 280/280; 280/281.1; 280/279; 280/276; 301/110.5; 301/110.6; 301/124.2

(58) Field of Classification Search ........... 280/280, 280/281.1, 279, 276; 301/110.5, 110.6, 124.2
See application file for complete search history.

(56) References Cited

U.S. PATENT DOCUMENTS

| 4,400,038 A | * | 8/1983 | Hosokawa | 301/124.2 |
| 4,964,287 A | | 10/1990 | Gaul | |
| 5,096,215 A | | 3/1992 | Chonan | |
| 5,531,510 A | * | 7/1996 | Yamane | 301/110.5 |
| 5,549,315 A | | 8/1996 | Ashman | |
| 5,823,555 A | * | 10/1998 | Ashman | 280/279 |
| 5,909,931 A | | 6/1999 | Tabe | |
| 5,984,423 A | | 11/1999 | Becker | |
| 6,296,322 B1 | | 10/2001 | Marzocchi et al. | |
| 6,386,643 B1 | | 5/2002 | Marzocchi et al. | |
| 6,454,363 B1 | | 9/2002 | Vignocchi et al. | |
| 7,097,259 B2 | * | 8/2006 | Toyoda | 301/110.5 |
| 7,484,609 B2 | * | 2/2009 | Chen | 192/64 |
| 2004/0036251 A1 | | 2/2004 | Baldwin | |
| 2004/0189112 A1 | | 9/2004 | Fujii et al. | |
| 2005/0110335 A1 | | 5/2005 | Rose et al. | |
| 2005/0264097 A1 | | 12/2005 | Meggiolan | |
| 2006/0158022 A1 | | 7/2006 | Nicolai | |
| 2007/0052285 A1 | | 3/2007 | Montague et al. | |
| 2007/0052286 A1 | | 3/2007 | Montague et al. | |
| 2007/0252427 A1 | | 11/2007 | Kanehisa | |

FOREIGN PATENT DOCUMENTS

WO WO 98/50268 11/1998
WO WO 2005/051753 6/2005

* cited by examiner

Primary Examiner—Lesley Morris
Assistant Examiner—Marlon A Arce
(74) Attorney, Agent, or Firm—Boyle Fredrickson, S.C.

(57) ABSTRACT

A wheel assembly, which is particularly applicable to bicycles, includes a hub, a pair of laterally spaced bearings, and is constructed to cooperate with a frame of a bicycle. The bearings include an outer race that is directly engaged with the hub. An inner race of each bearing is constructed to directly receive a portion of the bicycle frame such that the wheel is supported by direct interaction of the bicycle frame and the bearing members. Optionally, a hollow axle may extend between adjacent bearings to further enhance the lateral stiffness of the wheel assembly.

20 Claims, 5 Drawing Sheets

BICYCLE WHEEL ASSEMBLY

BACKGROUND OF THE INVENTION

The present invention relates generally to bicycles and, more particularly, to a bicycle wheel assembly that is constructed to directly engage a portion of a bicycle frame.

Known bicycle wheel assemblies generally include a hub that is centrally positioned relative to a rim that is shaped to receive a tire. One such wheel assembly 10 is shown in FIG. 5. As shown in FIG. 5, a number of spokes 11 extend between a hub 12 and a rim to maintain the generally concentric orientation of hub 12 and the rim. Hub 12 includes a hollow cavity 16 that is constructed to receive an axle 18 and a bearing element 20 at generally opposite sides thereof. Although axle 18 could be solid, many axles are hollow and constructed to receive a skewer rod 24 that passes through the axle 18 and engages a portion 26 of a bicycle frame 30, such as a fork, such that the alternate portions 26 generally flank the wheel assembly. In a front wheel application, portion 26 of frame 30 is commonly referred to as a fork, and axle 18 and skewer rod 24 are constructed to cooperate with a dropout 32 formed near the end of each respective fork. An end cap 36 is disposed between each bearing 20 and the respective dropout 32. A head 40 is engaged with the opposite ends of skewer rod 24 and secures wheel assembly 10 to frame 30. Although wheel assembly 10 provides a generally robust wheel assembly, it is not without its respective drawbacks.

The interaction of the drop outs 32 with the ends of axle 18 requires the inward spacing of the opposite bearings 20 and end caps 36 relative to the respective drop out 32. Each end cap 36 cooperates with hub 12 and axle 18 so as to provide the desired spacing associated with the distance between the forks 30. Axle 18, skewer rod 24, bearing 20, and hub 12 must be constructed to accommodate the offsetting of each bearing 20 inboard relative to the distal ends of axle 18 and the interface with dropout 32. The robust structure of these components increases the mass associated with wheel assembly 10.

Furthermore, the numerous individual interfaces between the various components of wheel assembly 10 further complicate both wheel assembly and manufacture. Axle 18 must be constructed to cooperate with a bearing 20 and end cap 36 positioned at the alternate ends of the axle as well as the pair of dropouts 32. Hub 12 must also be provided with an interior geometry configured to cooperate with each bearing 20 and end cap 36. Assembly and wheel maintenance requires that each bearing 20 and end cap 36 be associated in their appropriate position relative to hollow axle 18 and hub 12.

In addition to the assembly complications described above, wheel assembly 10 is also susceptible to decreased lateral stiffness do the interaction of the multiple components positioned at the interface between hub 12 and the pair of dropouts 32. The interaction of each bearing 20 and end cap 36 pair relative to axle 18 and hub 12, as well as the inboard offsetting of each bearing 20 with respect to the adjacent dropout 32, introduces some degree of lateral deflection of wheel assembly 10 during operation of a bicycle so equipped. Although wheel assembly 10 may be acceptable for some rider's expectations, such deflection may be unacceptable for other riders.

Therefore, there is a need for a bicycle wheel assembly that is lightweight and robust and that exhibits desired lateral stiffness and longevity for both the wheel and the wheel hub assembly.

BRIEF DESCRIPTION OF THE INVENTION

The present invention provides a bicycle wheel assembly that overcomes one or more of the aforementioned drawbacks. One aspect of the invention is directed to a wheel assembly, which is particularly applicable to bicycles, and that includes a hub and a pair of laterally spaced bearings. The bearings are constructed and positioned to directly cooperate with a frame of a bicycle. The bearings include an outer race that is directly engaged with the hub. An inner race of each bearing is constructed to directly receive a portion of the bicycle frame such that the wheel is supported by the direct interaction of the bicycle frame and the bearing members. Optionally, a hollow axle may extend between adjacent bearings to further enhance the lateral stiffness of the wheel assembly.

Another aspect of the invention discloses a bicycle wheel assembly having a hub, a rod constructed to extend from opposite sides of the hub, and a pair of bearings engaged with opposite sides of the hub. Each end of the rod is configured to engage a portion of a bicycle frame, such as a front or rear dropout. Each bearing has an outer surface that is engaged with the hub and an inner surface that is directly engaged by the portion of the bicycle frame. Such a construction simplifies the assembly of the wheel assembly.

Another feature of one or more of the above aspects is a hollow axle that cooperates with the rod, or skewer rod, such that the axle is positioned inboard of the left and right bearings of the wheel assembly. Preferably, each end of the hollow axle includes a first portion that is received within an inner race of the respective bearing and a second portion that forms a lip proximate the first portion for providing a thrust surface of each bearing. Preferably, the first portion extends into the bearing such that an inboard side of each bearing inner race is supported by the hollow axle and an outboard side of each bearing inner race is supported by the frame of the bicycle. Preferably, each frame section that is engaged with a bearing includes a first portion that passes into the inner race of the respective bearing a second portion that extends about the first portion and extends along a side of each respective bearing.

A further aspect of the present invention which is associated with one or more of the above aspects is that the bearing and frame assembly are associated with one or both of a front wheel assembly and/or a rear wheel assembly. If the wheel assembly is associated with a front wheel assembly, the frame portion that engages the bearing extends from an interior facing side of a respective fork.

Yet another aspect of the invention includes a method of communicating a bicycle wheel load to a bicycle frame in accordance with one or more of the aspects discussed above. The method includes communicating a tire load to a hub. An outer race of a wheel bearing is engaged with the hub thereby communicating the hub loading to the wheel bearing. A portion of a bicycle frame is directly engaged with an inner race of the bearing thereby providing for communication of the hub load to the bicycle frame with only a bearing being positioned between the hub and the bicycle frame.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE PREFERRED EMBODIMENT

Figure 1:
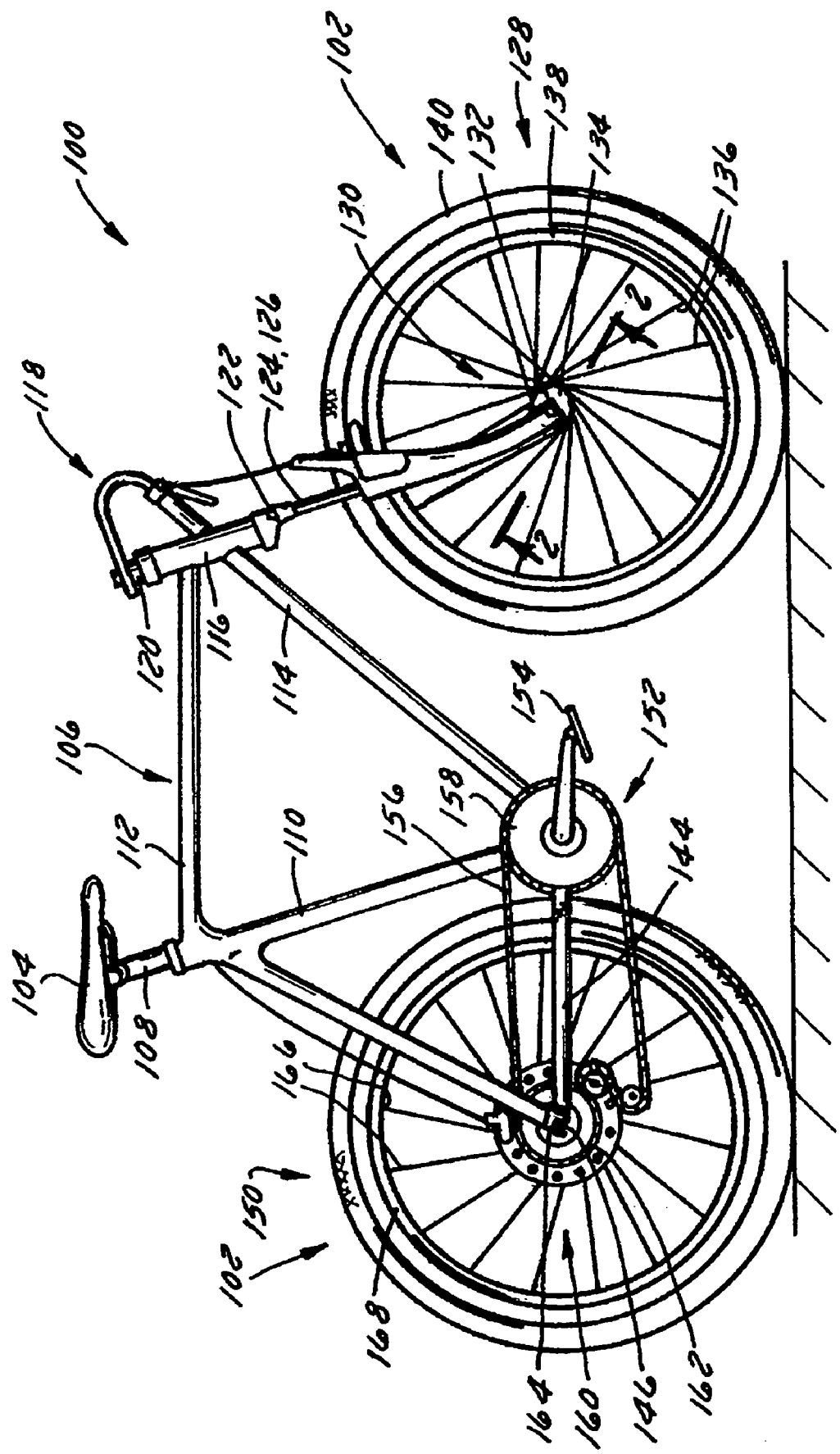
FIG. 1 is an elevational view of a bicycle equipped with a wheel assembly according to the present invention.

FIG. 1 shows a bicycle 100 equipped with a pair of wheel assemblies 102 that are constructed according to the present invention. Bicycle 100 includes a seat 104 that is slidably attached to a frame 106. A seat post 108 is connected to seat 104 and slidably engages a seat tube 110 of frame 106. A top tube 112 and a down tube 114 extend forwardly from seat tube 110 to a head tube 116 of frame 106. A handlebar or handlebar assembly 118 is connected to a stem tube 120 that passes through head tube 116 and engages a fork crown 122. The position of handlebar assembly 118 is fixed relative to stem tube 120 and fork crown 122 such that handlebar assembly 118 and fork crown 122 rotate together relative to head tube 116.

A pair of forks 124, 126 extend from generally opposite ends of fork crown 122 and are constructed to support a front wheel assembly 128 at an end of each fork or fork tip 130. Fork tips 130 cooperate with generally opposite sides of a rod or skewer 132 that is constructed to pass through a hub 134 of front wheel assembly 128. A number of spokes 136 extend between hub 134 and a rim 138 of front wheel assembly 128. A tire 140 is engaged with rim 138 such that rotation of tire 140, relative to forks 124, 126, rotates rim 138 and hub 134. Handlebar assembly 118 is connected to bicycle 100 such that side-to-side rotation of the handlebar assembly 118 rotates wheel assembly 128 relative to a longitudinal axis of bicycle 100 to steer bicycle 100.

Frame 106 includes a seat stay pair 142 and a chain stay pair 144 that offset an axis of rotation 148 of a rear wheel assembly 150 from a crankset 152. Crankset 152 includes a pair of pedals 154 that is operationally connected to a chain 156 via a chain ring or sprocket 158. Rotation of chain 156 communicates a drive force to a rear section 160 of bicycle 100. A gear cluster is positioned at rear section 160 and cooperates with chain 156. Gear cluster 162 is generally concentrically orientated with respect to axis 148 and includes a number of variable diameter gears.

Gear cluster 162 is operationally connected to a hub 164 of rear wheel assembly 150. A number of spokes 166 extend radially between hub 164 and a rim 168 of rear wheel assembly 150. As is commonly understood, rider operation of pedals 154 drives chain 156 thereby driving rear wheel assembly 150 which in turn propels the rider of bicycle 100. It is appreciated that the foregoing description of bicycle 100 is merely exemplary of a bicycle for use with the present invention. It is appreciated that bicycle 100 could be provided in any of a number of configurations including those configurations commonly referred to as street bikes, off-road or mountain bikes, hybrids of these types of bicycles, or other pedal driven vehicle configurations.

Figure 2:
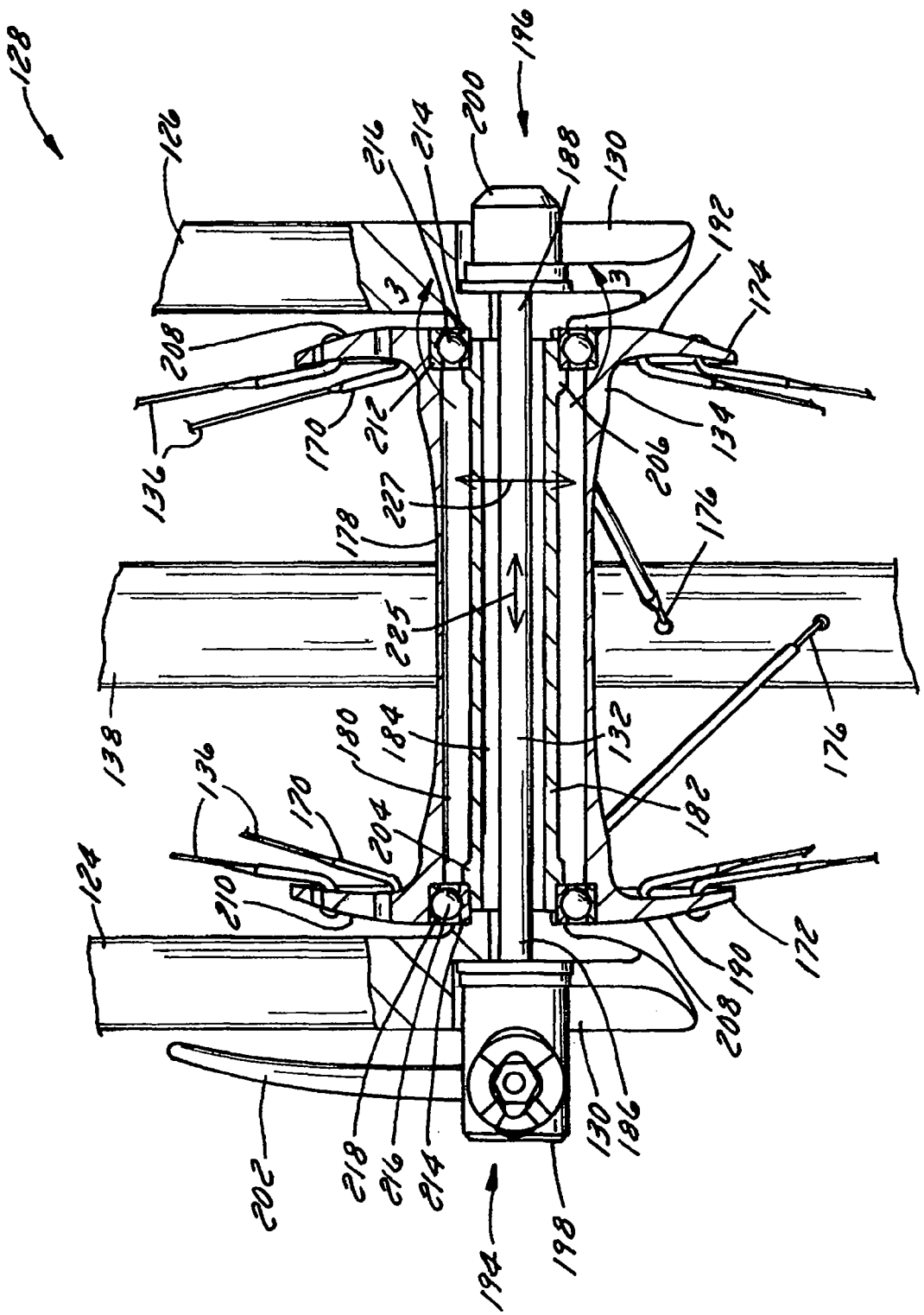
FIG. 2 is a partial cross-sectional view of the front wheel assembly shown in FIG. 1 and taken along line 2-2.

FIG. 2 is a partial cross-sectional view of front wheel assembly 128 taken along line 2-2 shown in FIG. 1. It is appreciated that either of front wheel assembly 128 or rear wheel assembly 150 could be constructed in accordance with the following description. Although only front wheel assembly 128 is shown by example, it is envisioned that bicycle 100 could be provided with either or both of front and rear wheel assemblies 128, 150 being constructed according to the present invention.

As shown in FIG. 2, each of spokes 136 includes a first end 170 that is secured to a respective flange 172; 174 of hub 134. A second end 176 of each spoke 136 is connected to rim 138. Flanges 172, 174 of hub 134 extend radially outward from a central portion 178 of hub 134. Central portion 178 of hub 134 is tube shaped and forms a passage 180 that is constructed to accommodate the passage of an axle 182 and skewer 132 through hub 134. Skewer 132 passes through a cavity 184 formed through axle 182 such that hub 134, axle 182, and skewer 132 are generally concentric with respect to one anther.

Opposite ends 186, 188 of skewer 132 pass beyond respective flanges 190, 192 of hub 134 and cooperate with fork tips 130 of forks 124, 126. Specifically, ends 186, 188 of skewer 132 cooperate with dropouts 194, 196 of forks 124, 126. A head 198, 200 is engaged with each end 186, 188 of skewer 132, respectively. Heads 198, 200 cooperate with dropouts 194, 196 such that, as described further below, manipulation of a lever 202 by a user facilitates securing and removing wheel assembly 128 from bicycle forks 124, 126.

Still referring to FIG. 2, axle 182 extends laterally across wheel assembly 128 from one end 204 to a second end 206. Axle 182 does not extend beyond an outer surface 208 of each of flanges 190, 192, respectively. Accordingly, axle 182 is unable to engage dropouts 194, 196. A bearing 210, 212 is positioned at each of ends 204, 206 of axle 182. Each bearing 210, 212 includes an inner race 214, a number of roller elements 216, and an outer race 218. Bearings 210, 212 are maintained in a generally radially concentric orientation with respect to hub 134 and axle 182.

Figure 3:
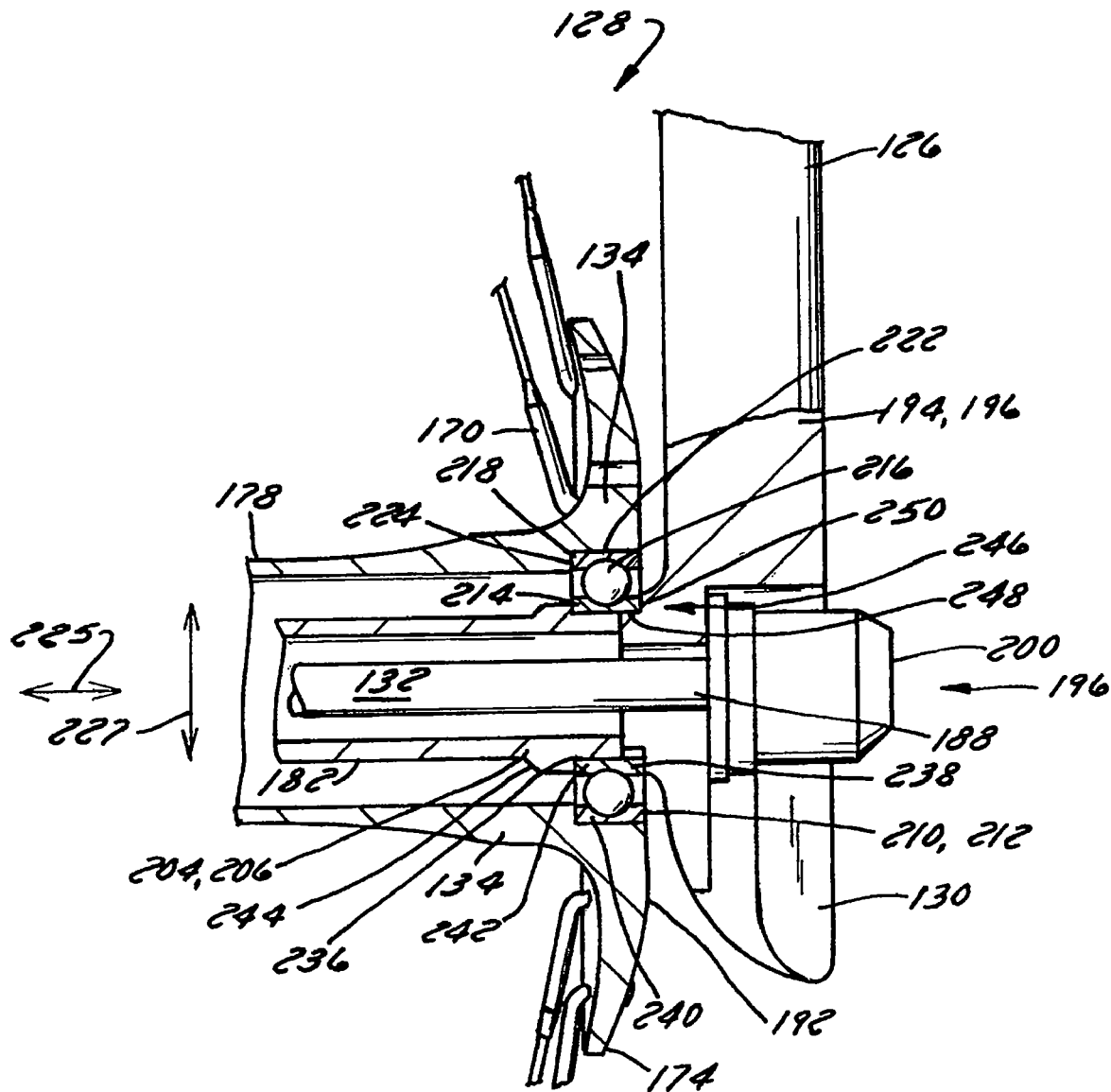
FIG. 3 is a detailed view taken along line 3-3 in FIG. 2 and shows the interface of one side of the wheel assembly with the bicycle frame.

As that shown in FIG. 3, hub 134 includes a hub seat 220 having a first portion 222 and a second portion 224. First and second portions 222, 224 of hub seat 220 are oriented generally transverse to one another such that outer race 218 of bearing 210, 212 supports hub 134 in both a lateral direction and a radial direction, as indicated by arrows 225, 227, respectively. Understandably, the lateral support 225 of hub 134 provided by portion 224 of each hub seat 220, is associated with the respective lateral side of bicycle 100 to which bearing 210, 212 is positioned. Said in another way, portion 224 of each hub seat 220 resists outboard translation of hub 134.

Each end 204, 206 of axle 182 includes an axle seat 236 that is constructed to engage an inboard portion 238 of inner race 214 of a respective bearing 210, 212. Axle seat 236 includes a first portion 240 and a second portion 242. First portion 240 of axle seat 236 is constructed to accommodate radial loading 227 associated with inner race 214 of bearing 210, 212. Second portion 242 of axle seat 236 extends in a crossing direction relative to first portion 240 and is constructed to accommodate lateral loading 225 of inner race 214. Second portion 242 of axle seat 236 is formed by a protrusion, projection, or lip 244 that extends generally about a circumference of axle 182 proximate ends 204, 206, respectively. Portion 242 of axle seat 236 resists inboard translation of bearings 210, 212 and transfers portions of the lateral loading 225 to the generally unloaded side of wheel assembly 128. Such a construction allows the lateral loading of wheel assembly 128 to be carried by a greater portion of the overall wheel assembly.

Similar to ends 204, 206 of axle 182, each dropout 194, 196 includes a dropout seat 246 that is constructed to directly engage a respective bearing 210, 212. Dropout seat 246 includes a first portion 248 and a second portion 250. First and second portions 248, 250 of dropout seat 246 are oriented generally transverse to one another. First portion 248 engages a radially interior surface of inner race 214 of bearing 210, 212. Second portion 250 of dropout seat 246 engages in outboard side surface of inner race 214 of bearing 210, 212. Such a construction communicates a portion of the radial loading 227 of hub 134 directly to the respective dropout 194, 196 via the interaction of portion 248 of dropout seat 246 with bearing 210, 212. Similarly, the interaction of bearing 210, 212 with second portion 250 of dropout seat 246 reduces the number of parts that must transmit the lateral loading of the wheel assembly before the lateral load is communicated to the more robust and resilient structure of the bicycle frame.

Figure 4:
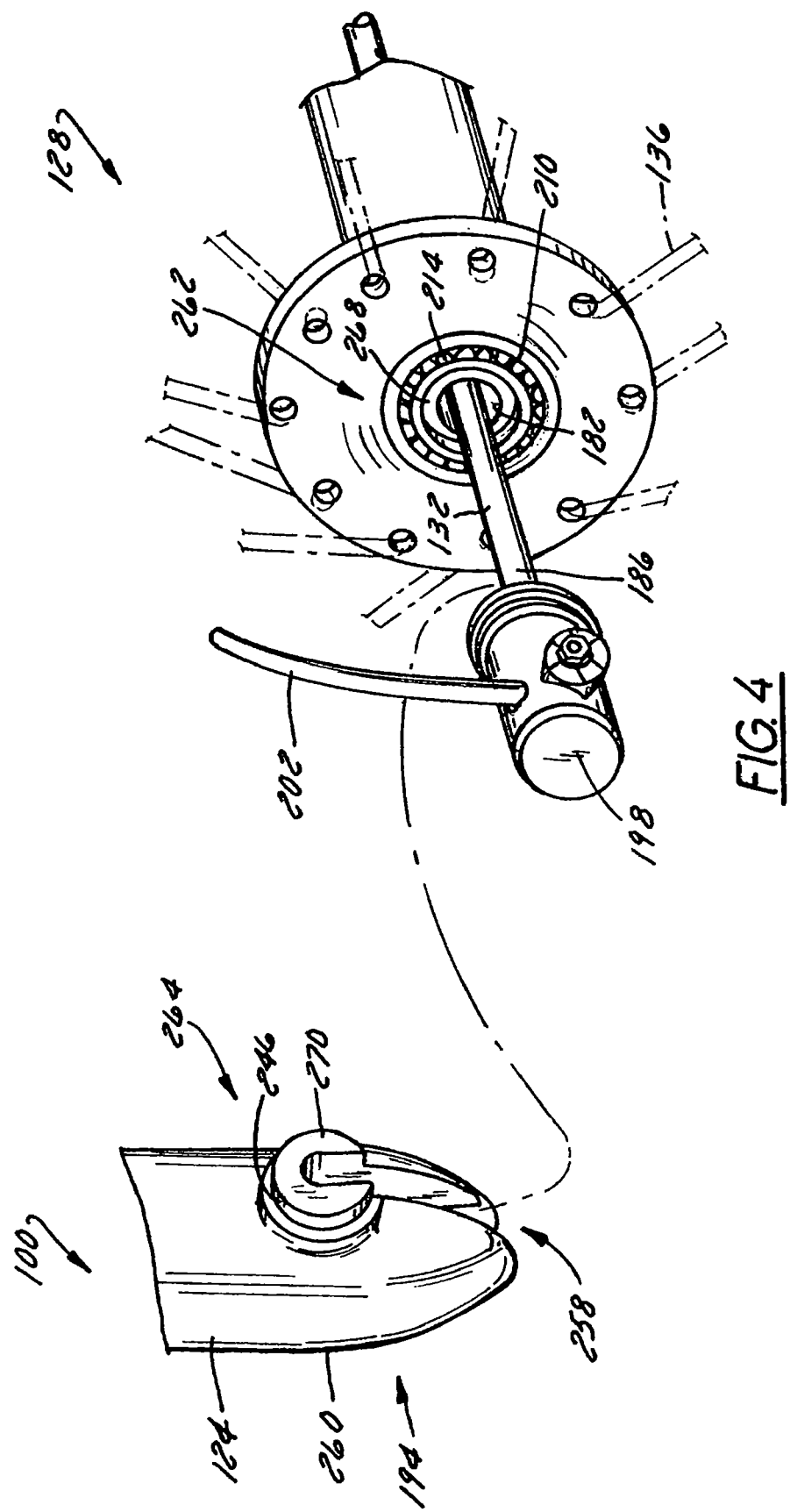
FIG. 4 is an exploded view of one side of the wheel assembly shown in FIG. 2 with the wheel disengaged from the bicycle frame.

FIG. 4 shows wheel assembly 128 removed from bicycle 100. Dropout 194 of fork 124 includes a channel 258 that is constructed to slidingly cooperate with end 186 of skewer 132. Head 198 of wheel assembly 128 is constructed to cooperate with an outboard side 260 of fork 124. An outboard end 262 of wheel assembly 128 is constructed to cooperate with an inboard side 264 of fork 124. Dropout seat 246 is constructed to be snuggly received within a cavity 266 defined by inner race 214 of bearing 210 and an end face 268 of axle 182. Manipulation of lever 202 relative to head 198 alters the distance between heads 198, 200 such that a projection 270 associated with dropout seat 246 of fork 124 can be slidably positioned within cavity 266 of wheel assembly 128 when skewer 132 is positioned within channel 258 of fork 124. Head 200 and skewer 188 cooperate in a generally similar manner with fork 126 other than head 200 need not be provided with a lever or other adjustable operator.

Figure 5:
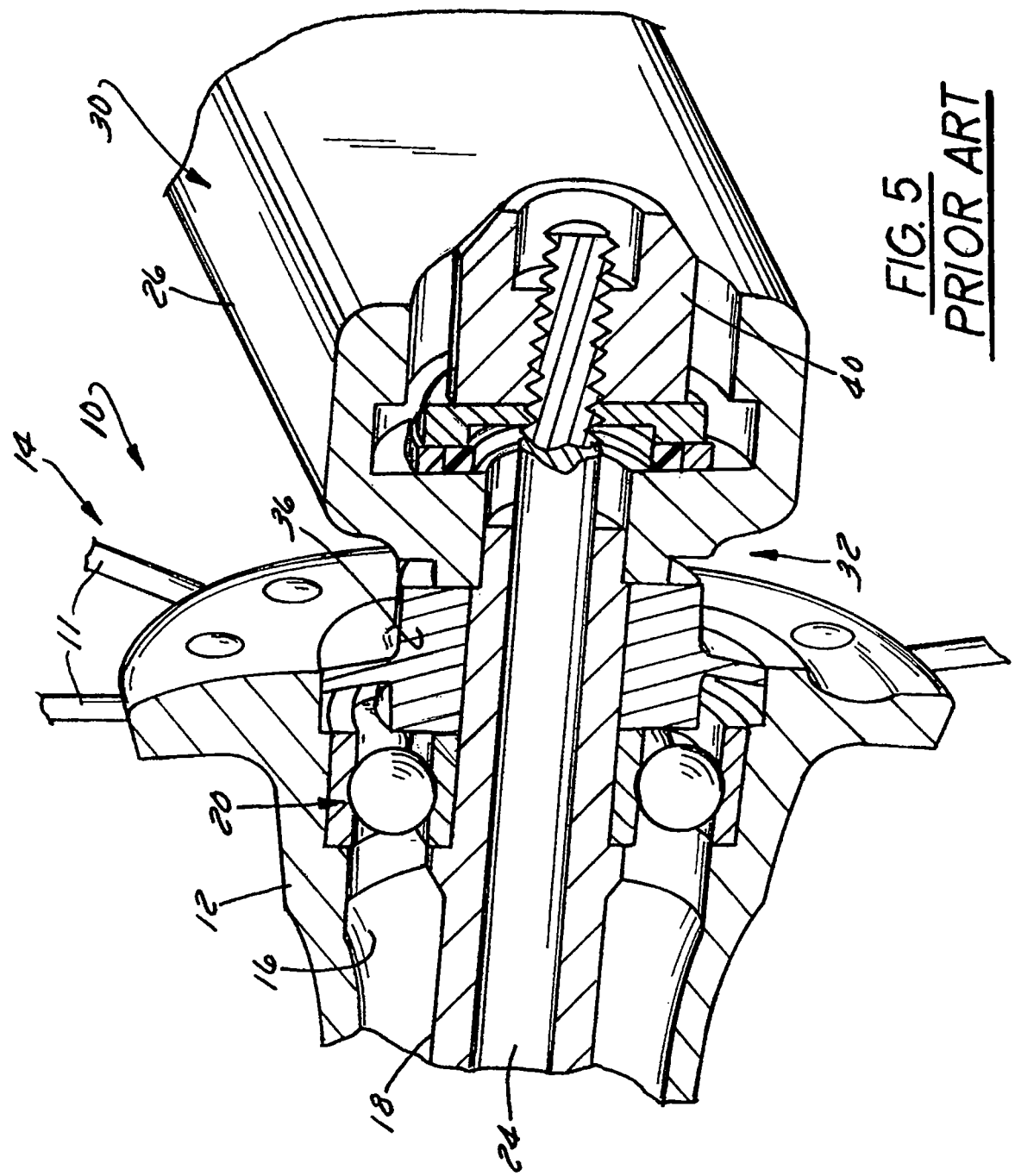
FIG. 5 is a partial cross-sectional view of a prior art wheel assembly.

Referring to FIGS. 2-4, the direct interface of bearings 210, 212 with dropouts 194, 196 allows the frame of bicycle 100 to directly carry a portion of both the radial and lateral loading of wheel assembly 128. Such a construction provides a wheel assembly 128 having a number of bearings 210, 212 wherein each bearing includes an outer race 218 that is laterally and radially supported by a hub 134 of the wheel assembly 128, and an inner race 214 wherein, an inboard side of the inner race 214 is radially and laterally supported by axle 182, and an outboard side of inner race 214 is radially and laterally supported by a respective dropout 194, 196. As compared to the assembly shown in FIG. 5, wheel assembly 128 displaces bearings 210, 212 further outboard and nearer the interface of hub 134 and the corresponding dropouts 194, 196.

Supporting the outboard sides of wheel assembly 128 through direct interaction of the wheel assembly 128 with drop outs 194, 196, provides a generally light weight and robust wheel assembly having improved lateral stiffness performance. Furthermore, seat 246 associated with each dropout 194, 196 of each fork 124, 126 provides a bicycle structure that is constructed to cooperate with either of wheel assembly 128 or prior art wheel assemblies such as that shown in FIG. 5. Such a construction further enhances the functionality of the wheel system by its ability to interact with existing bicycle structures.

The present invention has been described in terms of the preferred embodiment, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:

1. A bicycle wheel assembly comprising:
   a hub;
   a rod constructed to extend from opposite sides of the hub, each end of the rod configured to engage a portion of a bicycle frame; and
   a first bearing and a second bearing positioned at opposite sides of the hub, each bearing having a radially directed outer surface engaged with the hub and a radially directed inner surface that is directly engaged by the portion of the bicycle frame.

2. The bicycle wheel assembly of claim 1 further comprising an annular lip extending inward from each portion of the bicycle frame and which is received within one of the first and second bearings.

3. The bicycle wheel assembly of claim 1 further comprising an axle extending between the first bearing and the second bearing and positioned about the rod.

4. The bicycle wheel assembly of claim 3 wherein each end of the axle includes a first portion that extends into a respective bearing and a second portion having a larger diameter than the first portion.

5. The bicycle wheel assembly of claim 4 wherein the second portion has a diameter that is larger than a diameter of an interior opening of the respective bearing.

6. The bicycle wheel assembly of claim 1 wherein the hub includes a first seat and a second seat and wherein each seat is constructed to snuggly receive one of the first and second bearings.

7. The bicycle wheel assembly of claim 1 wherein the portion of the bicycle frame that engages the rod forms a fork tip.

8. A bicycle comprising:
   a frame;
   a seat attached to the frame and constructed to support a rider;
   a pair of wheels rotationally attached to the frame wherein at least one of the wheels includes:
      a tire;
      a hub positioned proximate a center of rotation of the tire;
      a skewer passing through the hub and engaged with the frame;
      at least one bearing having an outer race engaged with the hub and an inner race; and
   a projection extending inboard from a dropout of the frame and constructed to pass into the inner race of the at least one bearing.

9. The bicycle of claim 8 wherein the projection extends from a fork of frame.

10. The bicycle of claim 8 wherein the dropout is a rear dropout of the frame.

11. The bicycle of claim 8 further comprising another bearing engaged with a side of the hub generally opposite the at least one bearing.

12. The bicycle of claim 11 further comprising another projection that extends from the frame and is engaged with the another bearing.

13. The bicycle of claim 11 further comprising a hollow axle extending between the at least one bearing and another bearing and contained inboard of the hub, each end of the hollow axle including a thrust lip that abuts a lateral side of a respective bearing.

14. The bicycle claim 8 wherein each wheel of the pair of wheels includes at least one bearing having an outer race engaged with the hub and an inner race that is engaged by a projection extending from the frame.

15. A method of communicating a bicycle wheel load to a bicycle frame comprising:
communicating a tire load to a hub;
engaging an outer race of a bearing with the hub; and
directly engaging the bicycle frame with an inner race of the bearing; and
forming a ridge on the bicycle frame proximate a dropout and wherein the ridge includes a first ion that cooperates with an inner surface of the inner race of the bearing and a second portion that cooperates with a side surface of the inner race of the bearing.

16. The method of claim 15 further comprising supporting opposite lateral sides of the hub with bearings having an outer race that directly engages the hub and an inner race that directly engages the bicycle frame.

17. The method of claim 16 further comprising supporting an inboard side of each bearing with a hollow axle that extends between adjacent bearings.

18. The method of claim 17 further comprising further comprising forming a thrust wall in the hub for engaging a lateral side of the outer race, forming a thrust lip on generally opposite ends of the hollow axle for engaging a lateral side of the inner race of each bearing, and forming another thrust lip on the bicycle frame proximate the inner race of each bearing.

19. The method of claim 15 wherein the hub is further defined as one of a front tire hub, a rear tire hub, or both front and rear tire hubs on a single bicycle.

20. A bicycle wheel assembly comprising:
a hub;
a rod constructed to extend from opposite sides of the hub, each end of the rod configured to engage a portion of a bicycle frame;
a first bearing and a second bearing positioned at opposite sides of the hub, each bearing having an outer surface engaged with the hub and an inner surface that is directly engaged by the portion of the bicycle frame; and
an annular lip extending inward from each portion of the bicycle frame and which is received within one of the first and second bearings.

* * * * *